(12) United States Patent
Kalluri et al.

(10) Patent No.: US 8,819,519 B2
(45) Date of Patent: Aug. 26, 2014

(54) SYSTEMS AND METHODS FOR ENHANCED ACCURACY NPML CALIBRATION

(75) Inventors: Madhusudan Kalluri, Sunnyvale, CA (US); Fan Zhang, Milpitas, CA (US); Bruce Wilson, San Jose, CA (US); Johnson Yen, Fremont, CA (US)

(73) Assignee: LSI Corporation, San Jose, CA (US)

( * ) Notice: Subject to any disclaimer, the term of this patent is extended or adjusted under 35 U.S.C. 154(b) by 141 days.

(21) Appl. No.: 13/535,799

(22) Filed: Jun. 28, 2012

(65) Prior Publication Data
US 2014/0006878 A1    Jan. 2, 2014

(51) Int. Cl.
*H03M 13/00*    (2006.01)

(52) U.S. Cl.
USPC .............. 714/758; 714/769; 714/763

(58) Field of Classification Search
USPC ............. 714/758, 769, 766, 763, 770, 20
See application file for complete search history.

(56) References Cited

U.S. PATENT DOCUMENTS

| | | | |
|---|---|---|---|
| 6,166,872 A * | 12/2000 | Uno et al. | 360/65 |
| 6,535,553 B1 | 3/2003 | Limberg et al. | |
| 7,248,630 B2 | 7/2007 | Modrie et al. | |
| 7,257,764 B2 | 8/2007 | Suzuki et al. | |
| 7,421,017 B2 | 9/2008 | Takatsu | |
| 7,502,189 B2 | 3/2009 | Sawaguchi et al. | |
| 7,715,471 B2 | 5/2010 | Werner et al. | |
| 8,018,360 B2 | 9/2011 | Nayak | |
| 8,046,666 B2 | 10/2011 | Park et al. | |
| 8,208,213 B2 | 6/2012 | Liu et al. | |
| 8,479,086 B2 * | 7/2013 | Xia et al. | 714/795 |
| 2006/0123285 A1 | 6/2006 | De Araujo | |
| 2009/0002862 A1 | 1/2009 | Park et al. | |
| 2011/0072335 A1 | 3/2011 | Liu et al. | |
| 2011/0075569 A1 | 3/2011 | Marrow | |
| 2011/0164332 A1 | 7/2011 | Cao | |
| 2011/0167227 A1 | 7/2011 | Yang et al. | |
| 2012/0019946 A1 | 1/2012 | Aravind | |
| 2012/0056612 A1 | 3/2012 | Mathew | |
| 2012/0069891 A1 | 3/2012 | Zhang | |
| 2012/0124119 A1 | 5/2012 | Yang | |
| 2012/0236430 A1 | 9/2012 | Tan | |

OTHER PUBLICATIONS

U.S. Appl. No. 13/525,188, filed Jun. 15, 2012, Yang Han, Unpublished.
U.S. Appl. No. 13/491,062, filed Jun. 7, 2012, Jin Lu, Unpublished.
U.S. Appl. No. 13/525,182, filed Jun. 15, 2012, Yang Han, Unpublished.
U.S. Appl. No. 13/346,556, filed Jan. 9, 2012, Haitao Xia, Unpublished.
U.S. Appl. No. 13/239,719, filed Sep. 22, 2011, Haitao, Xia, Unpublished.
U.S. Appl. No. 13/272,209, filed Oct. 12, 2011, Yu Liao, Unpublished.

* cited by examiner

*Primary Examiner* — Fritz Alphonse
(74) *Attorney, Agent, or Firm* — Hamilton DeSanctis & Cha

(57) ABSTRACT

The present invention is related to systems and methods for adaptive parameter modification in a data processing system. As one example, a system is disclosed that includes a filter calibration circuit that is operable to calculate an updated coefficient for a filter circuit using a data set pair including a converged output and a corresponding data set.

29 Claims, 5 Drawing Sheets

US 8,819,519 B2

SYSTEMS AND METHODS FOR ENHANCED ACCURACY NPML CALIBRATION

BACKGROUND OF THE INVENTION

The present invention is related to systems and methods for performing data processing, and more specifically to systems and methods for adaptive parameter modification in a data processing system.

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by noise arising in the data transfer. To deal with such noise, some data processing systems utilize noise predictive filtering as part of a data detection process. However, in some cases, existing noise predictive filtering leads to inaccurate results in various noise scenarios.

Hence, for at least the aforementioned reasons, there exists a need in the art for advanced systems and methods for data processing.

BRIEF SUMMARY OF THE INVENTION

The present invention is related to systems and methods for performing data processing, and more specifically to systems and methods for adaptive parameter modification in a data processing system.

Various embodiments of the present invention provide data processing systems that include a sample buffer, a data processing circuit, an output buffer, an availability determination circuit, and a filter calibration circuit. The data processing circuit includes a data detector circuit and a data decoder circuit.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
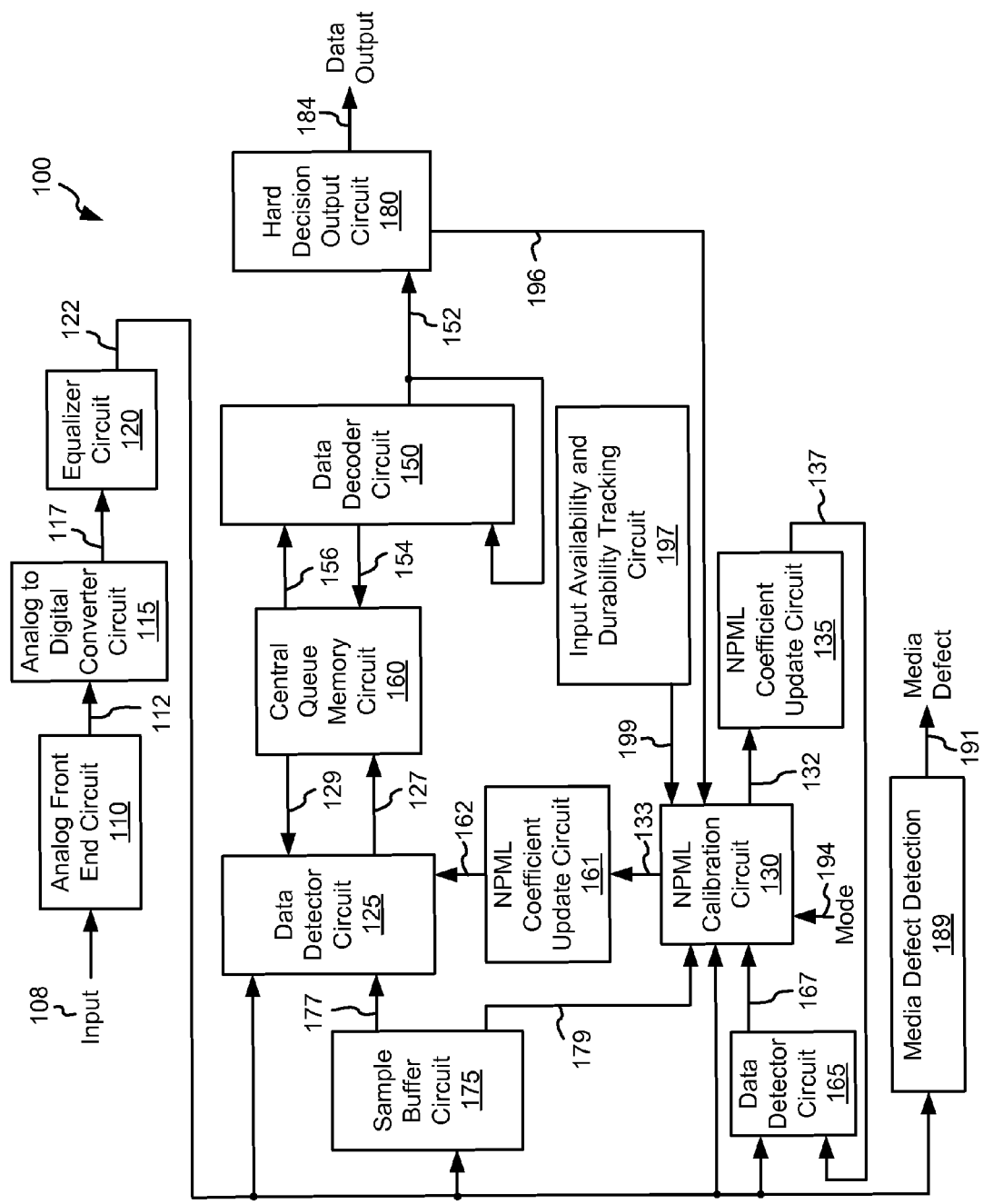
FIG. 1 depicts a data processing circuit having enhanced NPML calibration circuitry in accordance with some embodiments of the present invention.

The present invention is related to systems and methods for performing data processing, and more specifically to systems and methods for adaptive parameter modification in a data processing system.

Various embodiments of the present invention provide data processing circuits that include a data detector circuit and a data decoder circuit. The data detector circuit includes one or more noise predictive maximum likelihood (NPML) filtering circuits as part of the data detector circuit. A detected output from the data detector circuit is provided to the data decoder circuit that applies a data decode algorithm in an attempt to recover an originally written data set. Where application of the data decode algorithm yields the originally written data set, the decoded output is said to have "converged". In some cases, such convergence is indicated by satisfaction of all parity check equations relied upon in the data decode algorithm. Based upon the disclosure provided herein, one of ordinary skill in the art will recognize a variety of scenarios in which the decoded output is considered to have converged. Such a converged data set is provided as an output from the data processing circuit. A pass through both the data detector circuit and the data decoder circuit is referred to herein as a "global iteration". In some cases, the data processing circuit is designed to allow multiple global iterations. In various cases, the data decoding circuit may apply the data decode algorithm to the detected output multiple times during a given global iteration. In such cases, each application of the data decode algorithm is referred to herein as a "local iteration".

Operation of the NPML filtering circuits is governed by one or more filter coefficients that may be adaptively updated. Such adaptive updating of the filter coefficients is done using converged outputs and corresponding inputs. In some instances of the aforementioned embodiments, NPML scheduling circuitry is used to identify the availability and durability of both a converged output and the corresponding input. Where an appropriate availability and durability of both a converged output and the corresponding input, an NPML calibration is scheduled. Updated filter coefficients resulting from the calibration are used to update the aforementioned data detector circuit.

Various embodiments of the present invention provide data processing systems that include a sample buffer, a data processing circuit, an output buffer, an availability determination circuit, and a filter calibration circuit. The sample buffer is operable to maintain a plurality of sample sets. The data processing circuit includes a data detector circuit and a data decoder circuit. The data detector circuit includes at least one filter circuit, and is operable to apply a data detection algorithm to each of the plurality of sample sets to yield respective detected outputs. The data decoder circuit is operable to apply a data decoding algorithm to each of the respective outputs to yield respective converged outputs. The output buffer is operable to store the respective converged outputs, and the availability determination circuit is operable to determine that one of the respective converged outputs is available in the output buffer at the same time that a corresponding one of the plurality of sample sets is available in the sample buffer. The filter calibration circuit is operable to calculate an updated coefficient for the filter circuit using a data set pair including the one of the respective converged outputs and the corresponding one of the plurality of data sets. In some cases, the filter circuit is a noise predictive maximum likelihood filter circuit. In various cases, the data detection algorithm may be, for example, Viterbi algorithm data detection algorithm, or a maximum a posteriori data detection algorithm. In some cases, the data decoder circuit is a low density parity check decoder circuit. In one or more cases, the data processing system is implemented as part of storage device or a receiving device. In one or more cases, the data processing system is implemented as part of an integrated circuit.

In various instances of the aforementioned embodiments, the filter calibration circuit is operable to calculate the updated coefficient for the filter circuit using the data set pair including the one of the respective converged outputs and the corresponding one of the plurality of data sets when an initial processing condition has passed. In some such instances, the data detector circuit is a main data detector circuit, and the system further includes a secondary data detector circuit. The secondary data detector circuit also includes at least one filter circuit, and is operable to apply the data detection algorithm to one of the plurality of sample sets to yield a secondary detected output. In such instances, the filter calibration circuit is further operable to calculate the updated coefficient for the filter circuit using a data set pair including the secondary detected output and the one of the plurality of sample sets when the initial processing condition exists.

In other instances of the aforementioned embodiments, the system further includes a coefficient update circuit operable to transfer the updated coefficient to the filter circuit during a break in operation of the data detector circuit. In one or more instances of the aforementioned embodiments, the system further includes a media defect detector circuit operable to assert a media defect where a defect in a medium from which the corresponding one of the plurality of data sets is derived. In such instances, the filter calibration circuit is may only be operable to calculate the updated coefficient for the filter circuit when the one of the respective converged outputs is no associated with assertion of the media defect.

In one or more instances of the aforementioned embodiments, the filter calibration circuit is operable to calculate an updated coefficient for fewer than all of the respective converged outputs. In some such cases, converged outputs that are selected for use in relation to calculating the updated coefficient is based upon an opportunistic availability of both the one of the respective converged outputs and the corresponding one of the plurality of data sets. The other converged outputs that are not selected may be ignored because one or both of the one of the respective converged outputs and the corresponding one of the plurality of data sets is/are no longer available.

Turning to FIG. 1, a data processing circuit 100 having enhanced NPML calibration circuitry is shown in accordance with some embodiments of the present invention. Data processing circuit 100 includes an analog front end circuit 110 that receives an analog input 108. Analog front end circuit 110 processes analog input 108 and provides a processed analog signal 112 to an analog to digital converter circuit 115. Analog front end circuit 110 may include, but is not limited to, an analog filter and an amplifier circuit as are known in the art. Based upon the disclosure provided herein, one of ordinary skill in the art will recognize a variety of circuitry that may be included as part of analog front end circuit 110. In some cases, analog input 108 is derived from a read/write head assembly (not shown) that is disposed in relation to a storage medium (not shown). In other cases, analog input 108 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which analog input 108 may be derived.

Analog to digital converter circuit 115 converts processed analog signal 112 into a corresponding series of digital samples 117. Analog to digital converter circuit 115 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 117 are provided to an equalizer circuit 120. Equalizer circuit 120 applies an equalization algorithm to digital samples 117 to yield an equalized output 122. In some embodiments of the present invention, equalizer circuit 120 is a digital finite impulse response filter circuit as are known in the art.

Equalized output 122 is provided to both a data detector circuit 125 and to a sample buffer circuit 175. In some cases data detector circuit 125 includes a primary data detector circuit and a secondary data detector circuit. In such a case, equalized output 122 is provided to both the secondary data detector circuit and to sample buffer circuit 175. Sample buffer circuit 175 stores equalized output 122 as buffered data 177 for use in subsequent iterations through data detector circuit 125. Data detector circuit 125 may be any data detector circuit known in the art that is capable of producing a detected output 127. As some examples, data detector circuit 125 may be, but is not limited to, a Viterbi algorithm detector circuit or a maximum a posteriori detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Detected output 125 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 127 is provided to a central queue memory circuit 160 that operates to buffer data passed between data detector circuit 125 and data decoder circuit 150. In some cases, central queue memory circuit 160 includes interleaving (i.e., data shuffling) and de-interleaving (i.e., data un-shuffling) circuitry known in the art. When data decoder circuit 150 is available, data decoder circuit 150 accesses detected output 127 from central queue memory circuit 160 as a decoder input 156. Data decoder circuit 150 applies a data decoding algorithm to decoder input 156 in an attempt to recover originally written data. The result of the data decoding algorithm is provided as a decoded output 152. Similar to detected output 127, decoded output 152 may include both hard decisions and soft decisions. For example, data decoder circuit 150 may be any data decoder circuit known in the art that is capable of applying a decoding algorithm to a received input. Data decoder circuit 150 may be, but is not limited to, a low density parity check (LDPC) decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs (e.g., if sample buffer circuit 175 is close to getting filled up), decoded output 152 is stored to a memory included in a hard decision output circuit 180. In turn, hard decision output circuit 180 provides the converged decoded output 152 as a data output 184 to a recipient (not shown). The recipient may be, for example, an interface circuit operable to receive processed data sets. Based upon the disclosure provided herein, one of ordinary skill in the art will recognize a variety of recipients that may be used in relation to different embodiments of the present invention. Where the original data is not recovered (i.e., the data decoding algorithm failed to converge) prior to a timeout condition, decoded output 152 indicates that the data is unusable as is more specifically discussed below, and data output 184 is similarly identified as unusable.

One or more iterations through the combination of data detector circuit 125 and data decoder circuit 150 may be made in an effort to converge on the originally written data set. As mentioned above, processing through both the data detector circuit and the data decoder circuit is referred to as a "global iteration". For the first global iteration, data detector circuit 125 applies the data detection algorithm to equalized output 122 without guidance from a decoded output. For subsequent global iterations, data detector circuit 125 applies the data detection algorithm to buffered data 177 as guided by decoded output 152. To facilitate this guidance, decoded output 152 is stored to central queue memory circuit 160 as a decoder output 154, and is provided from central queue memory circuit 160 as a detector input 129 when equalized output 122 is being re-processed through data detector circuit 125.

During each global iteration it is possible for data decoder circuit 150 to make one or more local iterations including application of the data decoding algorithm to decoder input 156. For the first local iteration, data decoder circuit 150 applies the data decoder algorithm without guidance from decoded output 152. For subsequent local iterations, data decoder circuit 150 applies the data decoding algorithm to decoder input 156 as guided by a previous decoded output 152. The number of local iterations allowed may be, for example, ten. Based upon the disclosure provided herein, one of ordinary skill in the art will recognize a variety of different numbers of local iterations that may be allowed in accordance with different embodiments of the present invention. Where the number of local iterations through data decoder circuit 150 exceeds that allowed, but it is determined that at least one additional global iteration during standard processing of the data set is allowed, decoded output 152 is provided back to central queue memory circuit 160 as decoded output 154. Decoded output 154 is maintained in central queue memory circuit 160 until data detector circuit 125 becomes available to perform additional processing.

In contrast, where the number of local iterations through data decoder circuit 150 exceeds that allowed and it is determined that the allowable number of global iterations has been surpassed for the data set and/or a timeout or memory usage calls for termination of processing of the particular data set, standard processing of the data set concludes and an error is indicated. In some cases, retry processing or some offline processing may be applied to recover the otherwise unconverged data set. Based upon the disclosure provided herein, one of ordinary skill in the art will recognize a variety of non-standard processing techniques that may be applied to recover the otherwise unrecoverable data set.

Data detector circuit 125 includes a number of NPML filter circuits as are known in the art. These NPML filter circuits operate based upon filter coefficients generated by an NPML calibration circuit 130. NPML calibration circuit 130 may be any circuit known in the art that is capable of generating one or more filter coefficients based upon a combination of a received data input and a corresponding decoded output. Based upon the disclosure provided herein, one of ordinary skill in the art will recognize a variety of implementations of NPML calibration circuit 130 that may be used in relation to different embodiments of the present invention.

A parallel data detector circuit 165 receives equalized output 122 and applies a data detection algorithm thereto to yield a detected output 167. In some embodiments of the present invention, data detector circuit 165 is identical to data detector circuit 125. In other embodiments of the present invention, data detector circuit 165 is a simplified version of data detector circuit 125. Based upon the disclosure provided herein, one of ordinary skill in the art will recognize a variety of data detector circuits and/or algorithms that may be used in relation to data detector circuit 165. In contrast to detected output 127 that includes soft data, detected output 167 includes hard decisions identified during application of the data detection algorithm. The hard decisions provided as detected output 167 are provided to NPML calibration circuit 130 along with equalized output 122.

When a mode input 194 is asserted indicating an initial processing condition, hard decisions provided as detected output 167 are aligned in time with the corresponding elements of equalized output 122 by NPML calibration circuit 130. The aligned data is used by NPML calibration circuit 130 to calculate updated NPML coefficients. These updated NPML coefficients are provided as a coefficient set 133 to an NPML coefficient update circuit 161 where they are stored until data detector circuit 125 is free to be updated. When data detector circuit 125 is free to be updated, NPML coefficient update circuit 161 transfers a coefficient set 162 corresponding to the previously stored coefficient set 133. In one particular embodiment of the present invention, NPML coefficient update circuit 161 is an asynchronous FIFO. Similarly, the updated NPML coefficients are provided as a coefficient set 132 to an NPML coefficient update circuit 135 where they are stored until data detector circuit 165 is free to be updated. When data detector circuit 165 is free to be updated, NPML coefficient update circuit 135 transfers a coefficient set 137 corresponding to the previously stored coefficient set 132. In one particular embodiment of the present invention, NPML coefficient update circuit 135 is an asynchronous FIFO. In various embodiments of the present invention, mode input 194 is user controllable. In other embodiments of the present invention, mode input 194 remains asserted to indicate the initial processing condition until a threshold error rate is achieved. In some cases, the threshold error rate is programmable, while in other cases it is fixed.

Where data processing circuit 100 is implemented as part of a storage device, a media defect detection circuit 189 may apply a media defect detection algorithm to determine whether the data being received as equalized output 122 was derived from a location on a storage medium that exhibits an increased likelihood of being defective. Media defect detection circuit 189 may be any media defect detection circuit known in the art. Where an increased likelihood of a defect is noted, a media defect output 191 is asserted.

Once the initial processing condition has passed, mode input 194 is asserted to indicate a steady operational condition. When in this steady operational condition, an input availability and durability tracking circuit 197 monitors the availability of corresponding paired sets of a converged data output in hard decision output circuit 180 and an equalized output 179 in sample buffer circuit 175. To avoid the need for excess storage in sample buffer circuit 175 and hard decision output circuit 180, input availability and durability tracking circuit 197 operates on an opportunistic basis by maintaining a database of all equalized outputs 122 maintained in sample buffer circuit 175 and all converged outputs maintained in hard decision output circuit 180. The data sets maintained in sample buffer circuit 175 and hard decision output circuit 180 are dynamically removed from the respective memories depending upon operating conditions of data processing circuit 100. Due to the limited memory resources, the dynamic removal process does not guarantee that an equalized output 122 and a corresponding converged output will be available at the same time. Further, in some cases, the equalized output 122 and the corresponding converged output may be available at the same time, but will not remain available (i.e., durability) for sufficient time to allow for NPML calibration based upon the set. In such cases, input availability and durability tracking circuit 197 not only assures that a set of data sets are available at the same time, but will remain available for sufficient time to assure that the NPML calibration can complete based upon the identified data sets.

When a corresponding paired set is identified that is both available and durable, the paired set is identified to NPML calibration circuit 130 as a set identifier 199. The equalized output from sample buffer circuit 175 indicated by set identifier 199 is accessed from sample buffer circuit 175 as a buffered output 179, and the corresponding converged output from hard decision output circuit 180 indicated by set identifier 199 is accessed from hard decision output circuit 180 as a converged output 196. Hard decisions provided as converged output 196 are aligned in time with the corresponding elements of buffered output 179 by NPML calibration circuit 130. The aligned data is used by NPML calibration circuit 130 to calculate updated NPML coefficients. These updated NPML coefficients are provided as coefficient set 133 to NPML coefficient update circuit 161 where they are stored until data detector circuit 125 is free to be updated. When data detector circuit 125 is free to be updated, NPML coefficient update circuit 161 transfers a coefficient set 162 corresponding to the previously stored coefficient set 133. Similarly, the updated NPML coefficients are provided as coefficient set 132 to NPML coefficient update circuit 135 where they are stored until data detector circuit 165 is free to be updated. When data detector circuit 165 is free to be updated, NPML coefficient update circuit 137 transfers a coefficient set 137 corresponding to the previously stored coefficient set 132.

In some embodiments of the present invention, a particular equalized output is removed or released from sample buffer circuit 175 once application of the data detection algorithm by data detector circuit 125 during the last global iteration for the particular equalized output is ongoing. In such a case, the particular equalized output will not still be available in sample buffer circuit 175 at the same time that the corresponding converged output is available in the hard decision output circuit 180. In contrast, where application of the data decode application by the data decode circuit converges prior to the last allowable global iteration applied to the particular equalized output, the particular equalized output will remain in sample buffer circuit 175 at the same time that the corresponding converged output is available in the hard decision output circuit 180. However, this availability is temporary as one or both of the particular equalized output will be removed from sample buffer circuit 175 and the corresponding converged output will be removed from hard decision output circuit 180. In particular, the converged output will remain in hard decision output circuit until either a downstream recipient is available to receive the converged output and/or until other preceding converged outputs are available so that all of the converged outputs can be provided to a downstream recipient in order. The particular equalized output is maintained in sample buffer circuit 175 until the slot it is occupying in sample buffer circuit 175 is needed to receive a new equalized output 122. Thus, NPML calibration circuit 130 will not update the coefficients using each processed data set, but rather only those data sets that input availability and durability tracking circuit 197 identifies as opportunistically available. Further, in some embodiments of the present invention, data sets that either fail to converge or are associated with a media defect as indicated by media defect output 191 are not used to perform NPML calibration.

In one particular embodiment of the present invention, a pair of an equalized output and a corresponding converged output available in data processing circuit are considered sufficiently durable for NPML calibration where transfer of the converged data set to a recipient device has not yet started. In such a case, input availability and durability tracking circuit 197 may operate in accordance with the following pseudocode:

```
/*is a pair of an equalized output and a corresponding converged output
available?*/
If (Media Defect Output is NOT Asserted
    && Converged Data Set Available
    && Equalized Output Available)
{
    /*is the pair sufficiently durable to allow for NPML calibration?*/
    If (Transfer of the Converged Data Set Has Not Yet Begun)
    {
        Temporarily Disallow Release of the Equalized Output From the
        Sample Buffer;
        Identify the Pair of the Equalized Output and the Corresponding
        Converged
            Output to the NPML Calibration Circuit to be Used for
            NPML Calibration
            and Coefficient Update; and
        Once NPML Calibration is Completed by the NPML Calibration
        Circuit, re-allow
            Release of the Equalized Output From the Sample Buffer.
    }
    Else
    {
        Do Not Update Coefficients;
        Release memory slot in sample buffer circuit 175 corresponding
        to current data set.
    }
}
Else
```

```
{
    Do Not Update Coefficients;
    Release memory slot in sample buffer circuit 175 corresponding to
    current data set.
}
```

In some cases, input availability and durability tracking circuit 197 includes a first in first out (FIFO) memory that is operable to maintain a list of converged data sets maintained in hard decision output circuit 180. The process of determining availability of a pair of an equalized output and a corresponding converged output involves pulling an indicator of the last converged data set in the FIFO and determining if it is still in hard decision output circuit 180 and the corresponding equalized output is still available in sample buffer circuit 175. Where both are still available, the indicator of the converged output is removed from the FIFO and input availability and durability tracking circuit 197 indicates the identified pair to NPML calibration circuit 130. Alternatively, if one or both of the converged data set and the corresponding equalized output is/are not still available, the indicator of the converged output is removed from the FIFO and input availability and durability tracking circuit 197 moves on to processing the next indicator of a converged data set in the FIFO. Input availability and durability tracking circuit 197 continually updates the FIFO to remain current with indicators identifying converged outputs being added to hard decision output circuit 180, and removing indicators corresponding converged outputs no longer available in hard decision output circuit 180. Such a FIFO based approach provides for opportunistic use of an identified pair in NPML calibration. Such an approach implements an NPML calibration on out-of-order pairs of an equalized output and a corresponding converged output. This out-of-order processing allows for a number of pairs to be used for NPML calibration without requiring additional buffering required for in-order processing. In some embodiments of the present invention, the memory in sample buffer circuit 175 and hard decision output circuit 180 may be modified to allow for concurrent read and write access to the same sector slot in the respective memories. Such a modification increases the overlap where both an equalized output and a corresponding converged output are available and accessible in the respective memories.

Figure 2A:
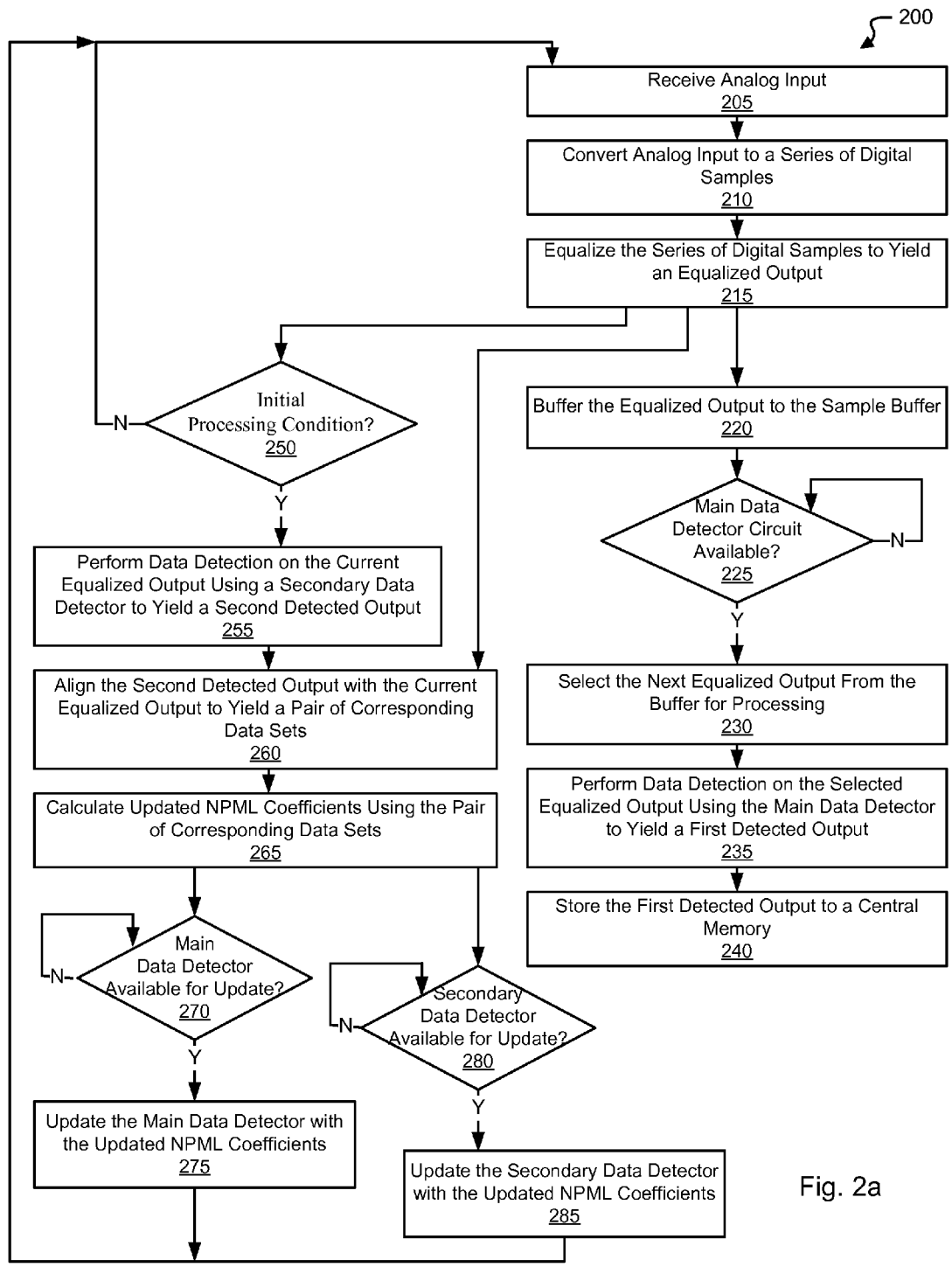
FIGS. 2a-2c are flow diagrams showing a method in accordance with some embodiments of the present invention for NPML calibration.
Figure 2B:
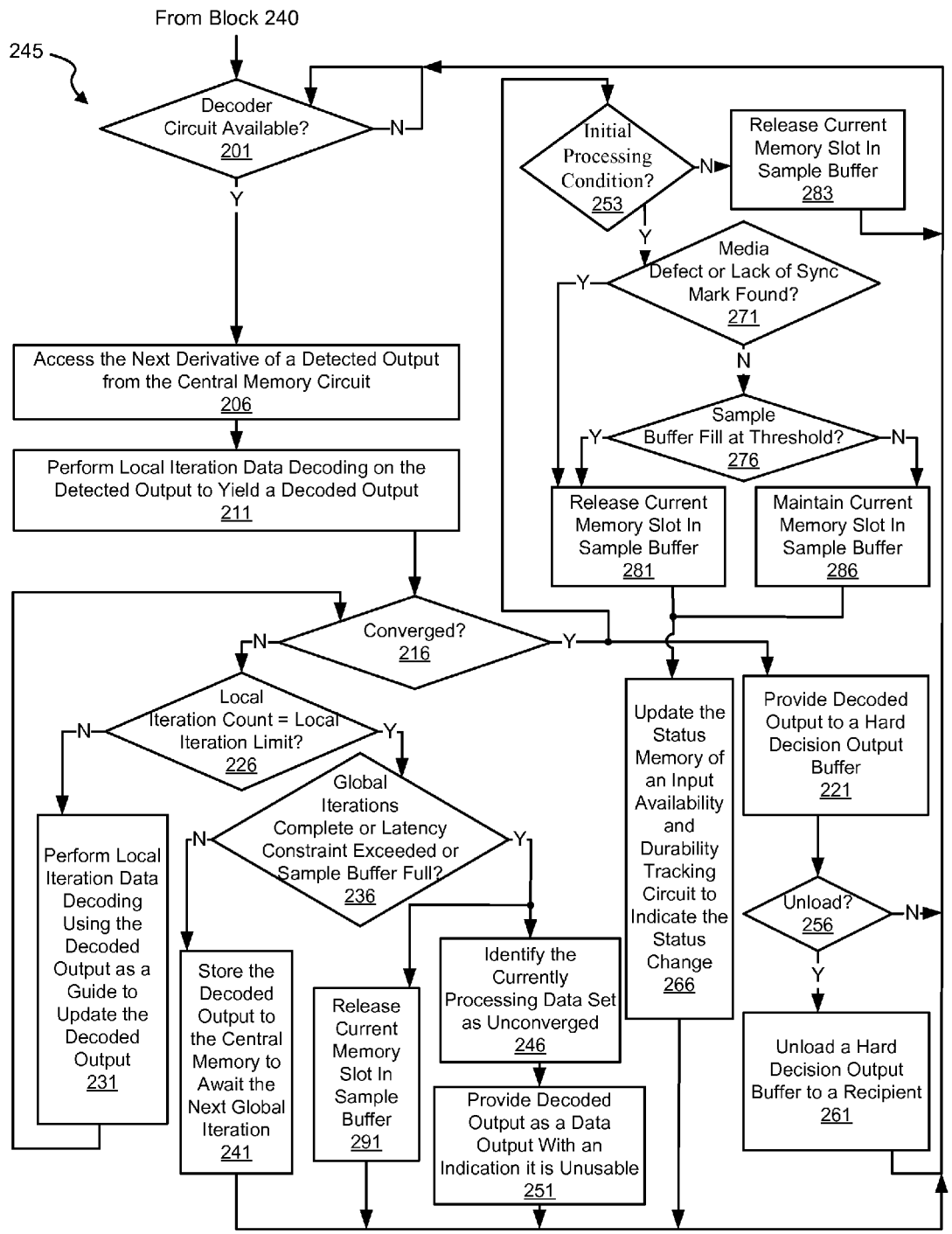
Figure 2C:
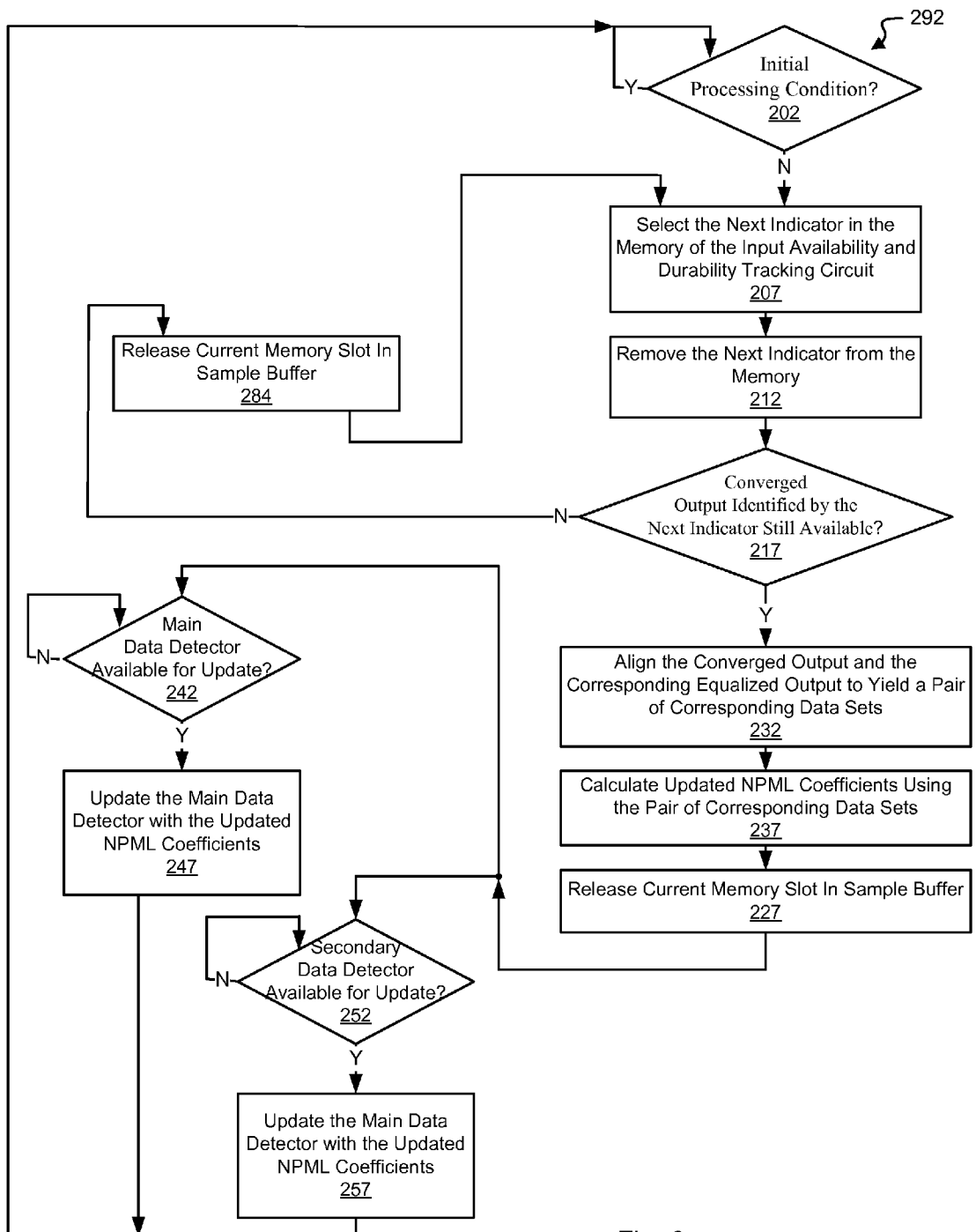

Turning to FIGS. 2a-2c, flow diagrams 200, 245, 292 show a method in accordance with some embodiments of the present invention for NPML calibration. Following flow diagram 200 of FIG. 2a, an analog input is received (block 205). The analog input may be derived from, for example, a storage medium or a data transmission channel. Based upon the disclosure provided herein, one of ordinary skill in the art will recognize a variety of sources of the analog input. The analog input is converted to a series of digital samples (block 210). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 215). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention. The equalized output is buffered (block 220).

It is determined whether a main data detector circuit is available (block 225). Where the main data detector circuit is available (block 225), the next equalized output from the sample buffer is selected for processing (block 230), and a data detection is performed on the selected equalized output using the main data detector to yield a first detected output (block 235). Where it is the second or later global iteration for the selected equalized output, a previously generated decoder output is used to guide performance of the data detection. The data detection may be, but is not limited to, a Viterbi algorithm data detection or a maximum a posteriori data detection. Based upon the disclosure provided herein, one of ordinary skill in the art will recognize other data detection algorithms that may be used in relation to different embodiments of the present invention. The first detected output is then stored to a central memory where it awaits the availability of a downstream data decoder circuit (block 240).

In parallel, it is determined whether an initial processing condition exists (block 250). Such an initial processing condition may be user selectable in some embodiments of the present invention. In other embodiments, the initial processing condition exists until a threshold error rate is achieved. In some cases, the threshold error rate is programmable, while in other cases it is fixed. Where the initial processing condition exists (block 250), a data detection is performed on the selected equalized output using a secondary data detector to yield a second detected output (block 255). The secondary data detector may apply the same data detection algorithm applied by the main data detector. The second detected output is aligned with the currently received equalized output to yield a pair of corresponding data sets (block 260). This pair of corresponding data sets is used to calculate updated NPML coefficients for use by both the main data detector circuit and the secondary data detector circuit (block 265).

It is then determined whether the main data detector is available to be updated (block 270). Where the main data detector is available to be updated (block 270), the main data detector is loaded with the updated NPML coefficients (block 275). It is also determined whether the secondary data detector is available to be updated (block 280). Where the secondary data detector is available to be updated (block 280), the secondary data detector is loaded with the updated NPML coefficients (block 285).

Turning to FIG. 2b, flow diagram 245 shows an implementation of the aforementioned standard processing. Following flow diagram 245, it is determined whether a decoder circuit is available to process a previously stored first detected output (block 201). Where the decoder circuit is available (block 201), the next derivative of a detected output is selected for processing and accessed from the central memory circuit (block 206). A first local iteration of a data decoding algorithm is applied by the data decoder circuit to the selected detected output to yield a decoded output (block 211). In some embodiments of the present invention, the data decoding algorithm is a low density parity check algorithm.

It is then determined whether the decoded output converged (i.e., yielded a correct result) (block 216). Where the decoded output converged (block 216), the decoded output is provided to a hard decision output buffer (block 221). It is then determined whether the hard decision output buffer is ready to be unloaded (block 256). In some cases, the hard decision output buffer is ready to be unloaded when the most recently completed decoded output is the next decoded output after that previously provided as a data output. Where the hard decision output buffer is ready to be unloaded (block 256), all of the continuous decoded outputs maintained in the hard decision output buffer are provided as a data output to a recipient device (block 261). Based upon the disclosure provided herein, one of ordinary skill in the art will recognize a variety of recipient devices that may be used in relation to different embodiments of the present invention.

Alternatively, where the decoded output failed to converge (block 216), it is determined whether the local iteration count has exceeded a local iteration limit (block 226). This local iteration limit may be, for example, ten local iterations. Where the number of local iterations has not yet been exceeded (block 226), the data decoding algorithm is re-applied to the currently processing data set for a subsequent local iteration guided by the decoded output to yield an updated decoded output (block 231). The processes beginning at block 216 are then repeated.

Alternatively, where the number of local iterations for the currently proceeding global iteration have been exceeded (block 226), it is determined if the maximum number of global iterations have already been applied to the currently processing data set or if a latency constraint has been exceeded (block 236). The number of global iterations may be complete where, for example, a timeout condition has occurred or a memory usage limitation has been exceeded. In some cases, the timeout condition is met when the number of global iterations that have been applied to a given data set exceeds a number programmed into a max global iteration register (not shown). The latency constraint may be met where, for example, a timeout condition occurs indicating that the overall latency from when a data set is first introduced for processing until a current time has been exceeded. In some embodiments of the present invention, a timeout condition may occur when either a maximum number of global iterations has been applied or a maximum latency has occurred. Where the global iterations are not complete and the latency constraint has not been exceeded (block 236), the decoded output is stored to the central memory where it awaits use in guiding application of the data detection algorithm during a subsequent global iteration (block 241). Alternatively, where the global iterations are complete or the latency constraint is exceeded (block 236), the currently processing data set is identified as un-converged (block 246), and the decoded output is provided as a data output marked as unusable (block 251). In addition, the memory slot in the sample buffer where the currently processing data set is maintained is released for use by a new data set (block 291).

In addition, where the decoded output converged (block 216), it is determined whether the initial processing condition exists (block 253). Again, such an initial processing condition may be user selectable in some embodiments of the present invention. In other embodiments, the initial processing condition exists until a threshold error rate is achieved. In some cases, the threshold error rate is programmable, while in other cases it is fixed. Where the initial processing condition does not exist (block 253), the current memory slot in the sample buffer is released (block 283). Alternatively, where the initial processing condition exists (block 253), it is determined whether a media defect or lack of a sync mark found has occurred in relation to the currently processing data set (block 271). Where such a condition does not exist (block 271), it is determined whether the sample buffer is filled to a defined threshold level (block 276). Where the sample buffer is filled to the defined threshold level (block 276), the memory slot in the sample buffer where the currently processing data set is maintained is released for use by a new data set (block 291). Otherwise, where the sample buffer is not filled to the defined threshold level (block 276), the memory slot in the sample buffer where the currently processing data set is maintained continues to be maintained (block 286). In any case (blocks 271, 281, 286), the status memory of an input availability and durability tracking circuit is updated to indicate the status change (block 266).

Turning to FIG. 2c, a flow diagram 292 shows a process for governing NPML calibration after initial calibration. Following flow diagram 292, it is determined whether the initial processing condition exists (block 202). Again, the initial processing condition may be user selectable in some embodiments of the present invention. In other embodiments, the initial processing condition exists until a threshold error rate is achieved. In some cases, the threshold error rate is programmable, while in other cases it is fixed. Where the initial processing does not exist (block 202), NPML calibration is performed based upon converged outputs and corresponding equalized outputs. As part of this processing, the next valid indicator in the memory of the input availability and durability tracking circuit is accessed (block 207). This indicator identifies a particular converged output that was earlier stored to the hard decision output buffer. This next indicator is then removed from the memory to avoid its reuse during later processing (block 212).

It is determined whether the converged output identified by the indicator accessed from the memory is still available in the hard decision output buffer (block 217). Availability may be indicated, for example, where transfer of the converged output out to a recipient device has not yet started. There is a limited memory space in the hard decision output buffer so converged outputs maintained therein may be transferred out to a recipient device as soon as one or more conditions are met. Transferring the converged outputs from the hard decision output circuit as soon as possible assure that there will be room in the buffer to accept the next converged output.

Where it is determined that the converged output identified by the indicator accessed from the memory is still available in the hard decision output buffer (block 217), the converged output and the corresponding equalized output are aligned to yield a pair of corresponding data sets (block 232). This pair of corresponding data sets is used to calculate updated NPML coefficients for use by both the main data detector circuit and the secondary data detector circuit (block 237). In addition, the memory slot in the sample buffer where the currently processing data set is maintained is released for use by a new data set (block 227). In a normal operation, the slot in the sample buffer would be released immediately upon the start of decoding during the final allowed global iteration for the processing data set. For noise predictive calibration processes, a data set may be opportunistically maintained for an additional period when this reservation of space in the sample buffer can be achieved without affecting the processing. By using such an opportunistic reservation process, buffer sizes can be maintained and yet allow the processing discussed herein. Where a data set happens to be available after convergence through the aforementioned opportunistic maintenance and the corresponding converged data set is still available in the output buffer, it can be used for calibration. Otherwise, where the corresponding converged data set has already been released from the output buffer, the status is updated and the next possible candidate for calibration is checked. Alternatively, where it is determined that the converged output identified by the indicator accessed from the memory is not still available in the hard decision output buffer (block 217), the current memory slot in the sample buffer is released (block 284), and the processes of blocks 207, 212, 217 are repeated.

It is determined whether the main data detector is available to be updated (block 242). Where the main data detector is available to be updated (block 242), the main data detector is loaded with the updated NPML coefficients (block 247). It is also determined whether the secondary data detector is available to be updated (block 252). Where the secondary data detector is available to be updated (block 252), the secondary data detector is loaded with the updated NPML coefficients (block 257).

Figure 3:
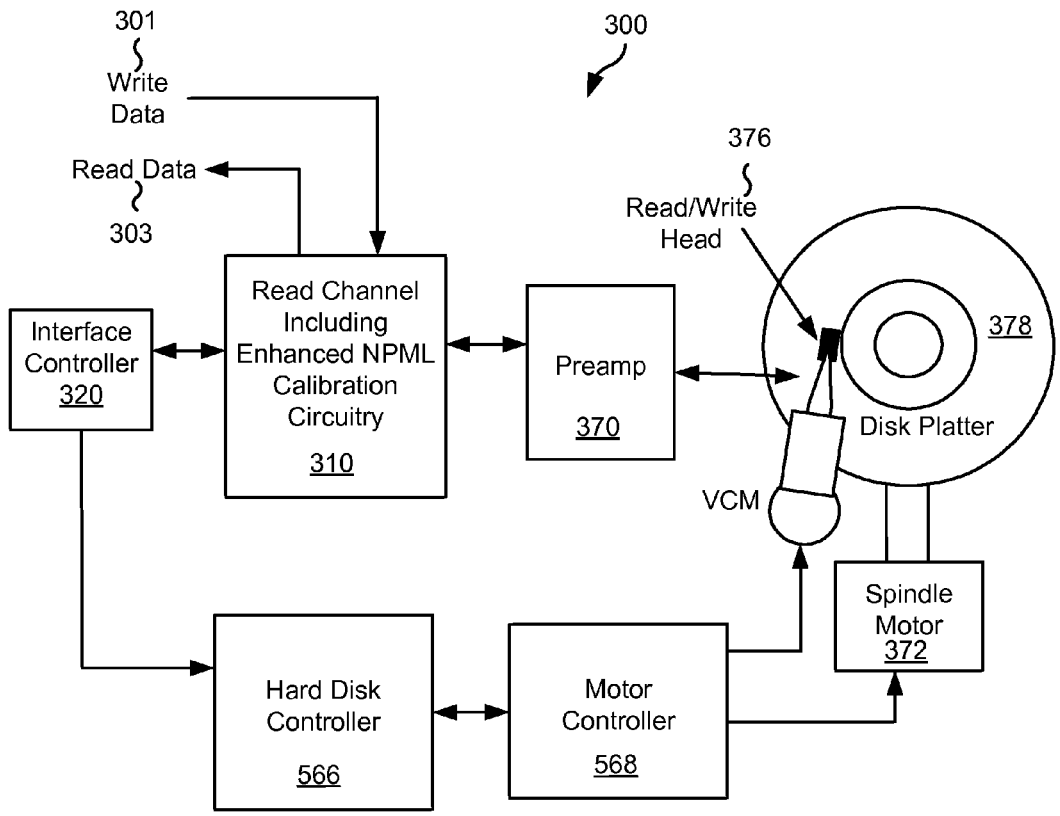
FIG. 3 shows a storage device including a read channel having enhanced NPML calibration circuitry in accordance with one or more embodiments of the present invention.

Turning to FIG. 3, a storage system 300 including a read channel circuit 310 having enhanced NPML calibration circuitry is shown in accordance with some embodiments of the present invention. Storage system 300 may be, for example, a hard disk drive. Storage system 300 also includes a preamplifier 370, an interface controller 320, a hard disk controller 366, a motor controller 368, a spindle motor 372, a disk platter 378, and a read/write head assembly 376. Interface controller 320 controls addressing and timing of data to/from disk platter 378. The data on disk platter 378 consists of groups of magnetic signals that may be detected by read/write head assembly 376 when the assembly is properly positioned over disk platter 378. In one embodiment, disk platter 378 includes magnetic signals recorded in accordance with either a longitudinal or a perpendicular recording scheme.

In a typical read operation, read/write head assembly 376 is accurately positioned by motor controller 368 over a desired data track on disk platter 378. Motor controller 368 both positions read/write head assembly 376 in relation to disk platter 378 and drives spindle motor 372 by moving read/write head assembly to the proper data track on disk platter 378 under the direction of hard disk controller 366. Spindle motor 372 spins disk platter 378 at a determined spin rate (RPMs). Once read/write head assembly 378 is positioned adjacent the proper data track, magnetic signals representing data on disk platter 378 are sensed by read/write head assembly 376 as disk platter 378 is rotated by spindle motor 372. The sensed magnetic signals are provided as a continuous, minute analog signal representative of the magnetic data on disk platter 378. This minute analog signal is transferred from read/write head assembly 376 to read channel circuit 310 via preamplifier 370. Preamplifier 370 is operable to amplify the minute analog signals accessed from disk platter 378. In turn, read channel circuit 310 decodes and digitizes the received analog signal to recreate the information originally written to disk platter 378. This data is provided as read data 303 to a receiving circuit. A write operation is substantially the opposite of the preceding read operation with write data 301 being provided to read channel circuit 310. This data is then encoded and written to disk platter 378.

During a read operation, data is sensed from disk platter 378 and processed through a data processing circuit including a data detector circuit and a data decoder circuit. Convergence on the originally written data set may involve one or more global iterations through both the data detector circuit and the data decoder circuit, and one or more local iterations through the data decoder circuit for each global iteration. The data detector circuit includes one or more NPML filtering circuits. Filter coefficients used to govern the NPML filter circuits are updated based at least in part on a converged output available in the data processing circuit. Such adaptive updating of the filter coefficients is done using converged outputs and corresponding inputs. In some cases, NPML scheduling circuitry is included in read channel circuit 310 and is used to identify the availability and durability of both a converged output and the corresponding input. Where an appropriate availability and durability of both a converged output and the corresponding input, an NPML calibration is scheduled. Updated filter coefficients resulting from the calibration are used to update the aforementioned data detector circuit. In some embodiments of the present invention, data processing circuits similar to that discussed above in relation to FIG. 1 may be used, and/or the processing may be done similar to that discussed above in relation to FIGS. 2a-2b.

It should be noted that storage system 300 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 300, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 310 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

Figure 4:
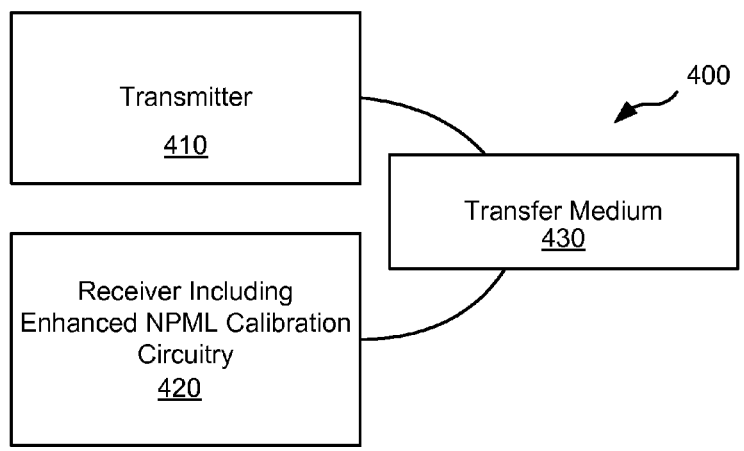
FIG. 4 shows a data transmission device including a receiver having enhanced NPML calibration circuitry in accordance with some embodiments of the present invention.

Turning to FIG. 4, a data transmission device 400 including a receiver 420 having enhanced NPML calibration circuitry is shown in accordance with some embodiments of the present invention. Data transmission system 400 includes a transmitter 410 that is operable to transmit encoded information via a transfer medium 430 as is known in the art. The encoded data is received from transfer medium 430 by receiver 420.

During operation, data is received by receiver 420 via transfer medium 430 where it is processed through a data processing circuit including a data detector circuit and a data decoder circuit. Convergence on the originally written data set may involve one or more global iterations through both the data detector circuit and the data decoder circuit, and one or more local iterations through the data decoder circuit for each global iteration. The data detector circuit includes one or more NPML filtering circuits. Filter coefficients used to govern the NPML filter circuits are updated based at least in part on a converged output available in the data processing circuit. Such adaptive updating of the filter coefficients is done using converged outputs and corresponding inputs. In some cases, NPML scheduling circuitry is included in receiver 420 and is used to identify the availability and durability of both a converged output and the corresponding input. Where an appropriate availability and durability of both a converged output and the corresponding input, an NPML calibration is scheduled. Updated filter coefficients resulting from the calibration are used to update the aforementioned data detector circuit. In some embodiments of the present invention, data processing circuits similar to that discussed above in relation to FIG. 1 may be used, and/or the processing may be done similar to that discussed above in relation to FIGS. 2a-2b.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
   a sample buffer operable to maintain a plurality of sample sets;
   a data processing circuit, wherein the data processing circuit includes:
      a data detector circuit operable to apply a data detection algorithm to each of the plurality of sample sets to yield respective detected outputs, wherein the data detector circuit includes at least one filter circuit; and
      a data decoder circuit operable to apply a data decoding algorithm to each of the respective outputs to yield respective converged outputs;
   an output buffer operable to store the respective converged outputs;
   an availability determination circuit operable to determine that one of the respective converged outputs is available in the output buffer at the same time that a corresponding one of the plurality of sample sets is available in the sample buffer; and
   a filter calibration circuit operable to calculate an updated coefficient for the filter circuit using a data set pair including the one of the respective converged outputs and the corresponding one of the plurality of data sets.

2. The data processing system of claim 1, wherein the filter calibration circuit is operable to calculate the updated coefficient for the filter circuit using the data set pair including the one of the respective converged outputs and the corresponding one of the plurality of data sets when an initial processing condition has passed.

3. The data processing system of claim 2, wherein the data detector circuit is a main data detector circuit, and wherein the system further comprises:
   a secondary data detector circuit operable to apply the data detection algorithm to one of the plurality of sample sets to yield a secondary detected output, wherein the secondary data detector circuit includes at least one filter circuit; and
   wherein the filter calibration circuit is further operable to calculate the updated coefficient for the filter circuit using a data set pair including the secondary detected output and the one of the plurality of sample sets when the initial processing condition exists.

4. The data processing system of claim 1, wherein the system further comprises:
   a coefficient update circuit operable to transfer the updated coefficient to the filter circuit during a break in operation of the data detector circuit.

5. The data processing system of claim 1, wherein the system further comprises:
   a media defect detector circuit operable to assert a media defect where a defect in a medium from which the corresponding one of the plurality of data sets is derived; and
   wherein the filter calibration circuit is only operable to calculate the updated coefficient for the filter circuit when the one of the respective converged outputs is no associated with assertion of the media defect.

6. The data processing system of claim 1, wherein the filter circuit is a noise predictive maximum likelihood filter circuit.

7. The data processing system of claim 1, wherein the data detection algorithm is selected from a group consisting of: a Viterbi algorithm data detection algorithm, and a maximum a posteriori data detection algorithm.

8. The data processing system of claim 1, wherein the data decoder circuit is a low density parity check decoder circuit.

9. The data processing system of claim 1, wherein the data processing system is implemented as part of a device selected from a group consisting of: a storage device and a receiving device.

10. The data processing system of claim 1, wherein the data processing system is implemented as part of an integrated circuit.

11. The data processing system of claim 1, wherein the filter calibration circuit is operable to calculate an updated coefficient for fewer than all of the respective converged outputs.

12. The data processing system of claim 11, wherein the respective converged outputs are selected for use in relation to calculating the updated coefficient based upon an opportunistic availability of both the one of the respective converged outputs and the corresponding one of the plurality of data sets.

13. The data processing system of claim 11, wherein other of the respective converged outputs are not selected for use in relation to calculating the updated coefficient based upon an non-availability of both the one of the respective converged outputs and the corresponding one of the plurality of data sets.

14. A method, the method comprising:
   storing a plurality of sample sets in a sample buffer;
   applying a data detection algorithm by a data detector circuit to each of the plurality of sample sets to yield respective detected outputs, wherein the data detector circuit includes at least one filter circuit;

applying a data decoding algorithm by a data decoder circuit to each of the respective outputs to yield respective converged outputs;

storing the respective converged outputs to an output buffer;

determining that one of the respective converged outputs is available in the output buffer at the same time that a corresponding one of the plurality of sample sets is available in the sample buffer; and calculating an updated coefficient for the filter circuit using a data set pair including the one of the respective converged outputs and the corresponding one of the plurality of data sets.

15. The method of claim 14, wherein the data detector circuit is a main data detector circuit, and wherein the method further comprises:

applying the data detection algorithm by a second data detector circuit the data detection algorithm to one of the plurality of sample sets to yield a secondary detected output, wherein the secondary data detector circuit includes at least one filter circuit;

determining that an initial processing condition exists, wherein the filter calibration circuit is further operable to calculate the updated coefficient for the filter circuit using a data set pair including the secondary detected output and the one of the plurality of sample sets when the initial processing condition exists; and determining that an initial processing condition, wherein the filter calibration circuit is operable to calculate the updated coefficient for the filter circuit using the data set pair including the one of the respective converged outputs and the corresponding one of the plurality of data sets when an initial processing condition has passed.

16. The method of claim 14, wherein calculating an updated coefficient is done for fewer than all of the respective converged outputs.

17. The method of claim 16, wherein the respective converged outputs are selected for use in relation to calculating the updated coefficient based upon an opportunistic availability of both the one of the respective converged outputs and the corresponding one of the plurality of data sets; and wherein other of the respective converged outputs are not selected for use in relation to calculating the updated coefficient based upon an non-availability of both the one of the respective converged outputs and the corresponding one of the plurality of data sets.

18. A storage device, the storage device comprising:
a storage medium;
a head assembly disposed in relation to the storage medium and operable to provide a sensed signal corresponding to information on the storage medium;
a read channel circuit including:
an analog front end circuit operable to provide an analog signal corresponding to the sensed signal;
an analog to digital converter circuit operable to sample the analog signal to yield a series of digital samples;
an equalizer circuit operable to equalize the digital samples to yield a sample set;
a sample buffer operable to maintain the sample set with other sample sets in a plurality of the sample sets;
a data processing circuit, wherein the data processing circuit includes:
a data detector circuit operable to apply a data detection algorithm to each of the plurality of sample sets to yield respective detected outputs, wherein the data detector circuit includes at least one filter circuit; and
a data decoder circuit operable to apply a data decoding algorithm to each of the respective outputs to yield respective converged outputs;
an output buffer operable to store the respective converged outputs;
an availability determination circuit operable to determine that one of the respective converged outputs is available in the output buffer at the same time that a corresponding one of the plurality of sample sets is available in the sample buffer; and
a filter calibration circuit operable to calculate an updated coefficient for the filter circuit using a data set pair including the one of the respective converged outputs and the corresponding one of the plurality of data sets.

19. The storage device of claim 18, wherein the read channel circuit further includes:
a media defect detector circuit operable to assert a media defect where a defect in the storage medium is detected; and
wherein the filter calibration circuit is only operable to calculate the updated coefficient for the filter circuit when the one of the respective converged outputs is not associated with assertion of the media defect.

20. The storage device of claim 18, wherein the filter calibration circuit is operable to calculate an updated coefficient for fewer than all of the respective converged outputs; wherein the respective converged outputs are selected for use in relation to calculating the updated coefficient based upon an opportunistic availability of both the one of the respective converged outputs and the corresponding one of the plurality of data sets; and wherein other of the respective converged outputs are not selected for use in relation to calculating the updated coefficient based upon an non-availability of both the one of the respective converged outputs and the corresponding one of the plurality of data sets.

21. A data processing system, the data processing system comprising:
an availability determination circuit operable to determine that a converged output is available and a data set from which the converged output was derived is available, wherein the converged output and the data set together are a data pair; and
a filter calibration circuit operable to calculate an updated coefficient for the filter circuit using the data pair.

22. The data processing system of claim 21, the system further comprising:
a sample buffer operable to maintain a plurality of sample sets, wherein the data set is one of the plurality of sample sets; and
an output buffer operable to store a plurality of converged outputs, wherein the converged output is one of the converged outputs.

23. The data processing system of claim 22, wherein the system further comprises:
a media defect detector circuit operable to assert a media defect where a defect in a medium from which the corresponding one of the plurality of sample sets is derived; and
wherein the filter calibration circuit is only operable to calculate the updated coefficient for the filter circuit when the one of the respective converged outputs is no associated with assertion of the media defect.

24. The data processing system of claim 22, the system further comprising:
a data processing circuit that includes:
a data detector circuit operable to apply a data detection algorithm to each of the plurality of sample sets to yield respective detected outputs, wherein the data detector circuit includes at least one filter circuit; and a data decoder circuit operable to apply a data decoding algorithm to each of the respective outputs to yield respective converged outputs, wherein the respective converged outputs are part of the plurality of converged outputs.

25. The data processing system of claim 24, wherein the data detector circuit is a main data detector circuit, and wherein the system further comprises:

a secondary data detector circuit operable to apply the data detection algorithm to one of the plurality of sample sets to yield a secondary detected output, wherein the secondary data detector circuit includes at least one filter circuit; and wherein the filter calibration circuit is further operable to calculate the updated coefficient for the filter circuit using a data pair including the secondary detected output and the data set when an initial processing condition exists.

26. The data processing system of claim 24, wherein the system further comprises:

a coefficient update circuit operable to transfer the updated coefficient to the filter circuit during a break in operation of the data detector circuit.

27. The data processing system of claim 21, wherein the filter circuit is a noise predictive maximum likelihood filter circuit.

28. The data processing system of claim 21, wherein the data processing system is implemented as part of a device selected from a group consisting of: a storage device and a receiving device.

29. The data processing system of claim 21, wherein the data processing system is implemented as part of an integrated circuit.

* * * * *